(12) United States Patent
Ta et al.

(10) Patent No.: US 6,474,364 B2
(45) Date of Patent: Nov. 5, 2002

(54) FLOW DEFLECTING DEVICE

(75) Inventors: Tuan Ta, Middlesex; Jo Hague, Croydon, both of (GB)

(73) Assignee: Thames Water Utilities Limited, Berks (GB)

( * ) Notice: Subject to any disclaimer, the term of this patent is extended or adjusted under 35 U.S.C. 154(b) by 0 days.

(21) Appl. No.: 09/833,938

(22) Filed: Apr. 12, 2001

(65) Prior Publication Data

US 2002/0007859 A1 Jan. 24, 2002

(30) Foreign Application Priority Data

Apr. 20, 2000 (GB) .............................. 0009890

(51) Int. Cl.$^7$ ............................. F15D 1/02
(52) U.S. Cl. ..................... 138/37; 138/39; 366/336; 366/338
(58) Field of Search ............. 138/37, 39; 366/336–340

(56) References Cited

U.S. PATENT DOCUMENTS

| | | | |
|---|---|---|---|
| 2,746,406 A | * 5/1956 | Karjala ..................... 110/326 |
| 3,736,955 A | 6/1973 | Schlesser | |
| 4,270,577 A | * 6/1981 | Brown et al. ................. 138/39 |
| 4,666,675 A | * 5/1987 | Parker et al. ............... 366/336 |
| 5,323,661 A | * 6/1994 | Cheng ............................ 137/8 |
| 5,529,084 A | * 6/1996 | Mutsakis et al. ............. 137/13 |
| 5,752,548 A | * 5/1998 | Matsumoto et al. .......... 138/39 |
| 5,992,465 A | * 11/1999 | Jansen ........................ 138/37 |
| 6,161,594 A | * 12/2000 | Bente ........................ 138/177 |

FOREIGN PATENT DOCUMENTS

| | | |
|---|---|---|
| GB | 2138661 A | 10/1984 |
| GB | 2275545 A | 8/1994 |
| GB | 2325753 A | 12/1998 |
| GB | 2356466 A | 5/2001 |
| JP | 60101441 A | 6/1985 |

* cited by examiner

*Primary Examiner*—Patrick Brinson
(74) *Attorney, Agent, or Firm*—Alix, Yale & Ristas, LLP

(57) ABSTRACT

The invention relates to a flow deflecting device 5, comprising a substantially planar baffle adapted to be disposed in a conduit 2 having a first part 3 defining a first flow direction 3*a* and a second part 4 defining a second flow direction 4*a* deviating from the first direction, to promote substantially uniform flow in the second part 4.

24 Claims, 5 Drawing Sheets

FLOW DEFLECTING DEVICE

BACKGROUND OF THE INVENTION

The present invention relates to a flow deflecting device, fluid flow apparatus, a water treatment system including said device or apparatus and a method for treating water including the use of said device or said apparatus.

In processes and apparatus where fluids are conducted in conduits it has been found to be advantageous to have as uniform a fluid flow as possible. The reason for this is that non-uniform flow can often result in disruption of downstream process and inefficient running of downstream equipment. Non-uniform flow is not usually a problem in straight uniform diameter conduit runs but can be promoted and exacerbated by deviations in conduit direction and diameter. In these areas preferential flow to one side may occur.

One approach to achieving uniform flow has been to use a small entrance orifice to reduce sufficiently flow momentum so that flow enters the disruptive area almost from rest. Using small entrance orifices is undesirable however because it results in high head loss, and hence, increased operational cost.

The present invention seeks to mitigate problems such as this.

SUMMARY OF THE INVENTION

According to a first aspect of the invention there is provided a flow deflecting device, comprising a substantially planar baffle adapted to be disposed in a conduit having a first part defining a first flow direction and a second part defining a second flow direction deviating from the first direction, to promote substantially uniform flow in the second part.

It is preferred that the baffle corresponds in shape to a segment of the cross-sectional area of the first part of the conduit. It is particularly preferred that the device is adapted for use in a conduit including a first part having a substantially circular cross-section bore, the baffle comprising a segment defined by an arc and a chord of the bore.

The device may include mounting means, in the form of a tab disposed substantially perpendicularly to the baffle, the tab being shaped to correspond with the shape of a conduit in which it is to be situated.

According to a second aspect of the invention these is provided fluid-flow apparatus, comprising a conduit having a first part defining a first flow direction and a second part defining a second flow direction deviating from the first direction, and deflector means disposed in the conduit to promote substantially uniform flow in the second part. This arrangement provides a solution to the problem of non-uniform flow patterns, which can readily be applied to both new and also existing installations.

It is preferred that the deflector means depends from a wall of the conduit and that the deflector means is disposed in the first part of the conduit. More preferably the deflector means may be disposed on the same side of the conduit as the direction of deviation of the second part. The deflector means may also be substantially planar and for example may comprise a plate.

It is preferred that the deflector means comprises a segment defined by an arc and a cord of the bore of the first part.

The deflector means may depend substantially perpendicularly from the wall of the conduit and may extend from 5% to 50% the width of the cross section of the conduit. It is preferred that the conduit comprises a substantially circular bore, the deflector means being disposed a distance from the center of the bore of the second part corresponding to from a ½ to 2×the diameter of the bore of the first part.

It is preferred that the width the cross section of the second part increases the further from the divergence. For example, the second part may be substantially conical.

The apparatus may be adapted for conducting a liquid such as water.

According to a third aspect of the invention there is provided an inlet device for delivery of water to a water treatment device including apparatus as set out hereinabove.

According to a fourth aspect of the invention there is provided a counter current dissolved air flotation device, including apparatus as described hereinabove.

According to a fifth aspect of the invention there is provided a method of promoting uniform fluid flow in a conduit downstream from a divergence in direction in the conduit, including the step of providing a deflector in the conduit. The deflector may be disposed in the conduit upstream from the divergence and preferably the deflector is disposed in the fluid flow on the same side as the direction of the divergence.

According to a sixth aspect of the invention there is provided a method for treating water, including supplying the water to be treated to treatment apparatus using the method as set out hereinabove.

BRIEF DESCRIPTION OF THE DRAWING

The invention will further be described by way of example and with reference to the following drawings, in which:

FIGS. 6 and 6A are schematic side views of apparatus, illustrating a portion at an enlarged scale, according to a further aspect of the invention.

DESCRIPTION OF THE PREFERRED EMBODIMENT

Figure 1:
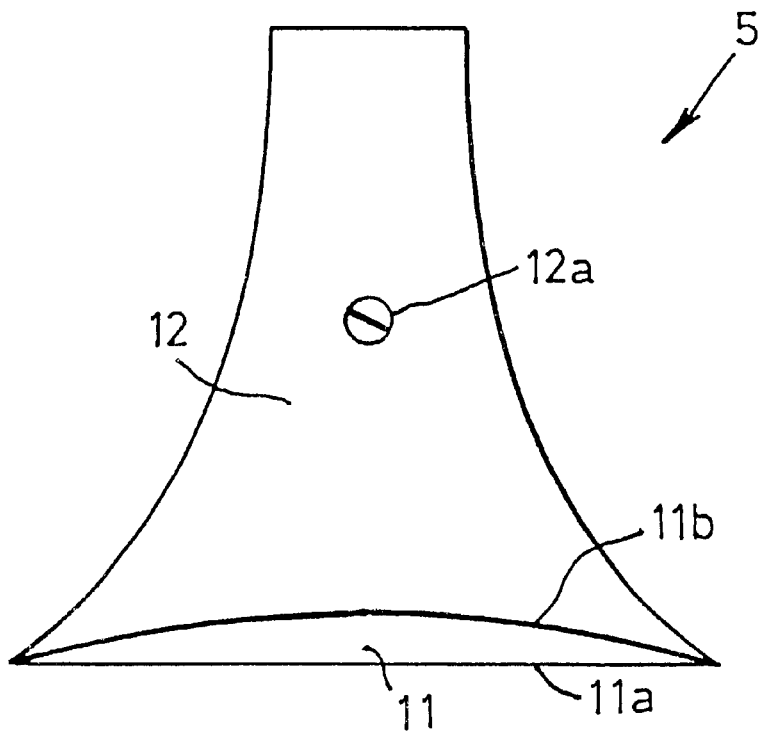
FIG. 1 is a plan view of a device according to one aspect of the invention.
Figure 2:
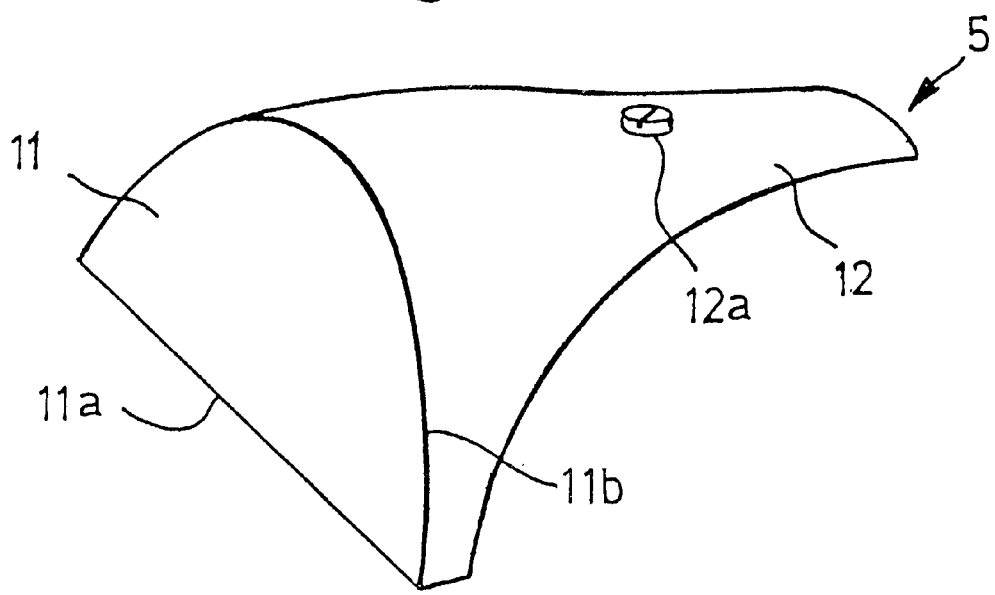
FIG. 2 is a side perspective view of the device of FIG. 1.

Referring to the drawings, and in particular to FIGS. 1 and 2, there is illustrated a flow deflecting device 5, comprising a substantially planar baffle adapted to be disposed in a conduit 2 having a first part 3 defining a first flow direction 3a and a second part 4 defining a second flow direction 4a deviating from the first direction, to promote substantially uniform flow in the second part 5.

As illustrated, the device 5 comprises a plate 11, which has a straight edge 11a and a cubed edge 11b. The curve is designed to correspond with the curvature of the bore of a conduit 2. The plate 11 is provided with a mounting means 12, in the form of a tab, which extends perpendicularly from the curved edge 11b and is also curved to correspond to the curvature of the bore of a conduit 2. The tab 12 has a screw fixing 12a for attachment to the conduit 2. The device 5 is formed from a relatively rigid material such as a metal or a plastic material, which is preferably inert. The device is mountable in a conduit 2 with the tab disposed either toward or away from the direction of flow.

Figure 3:
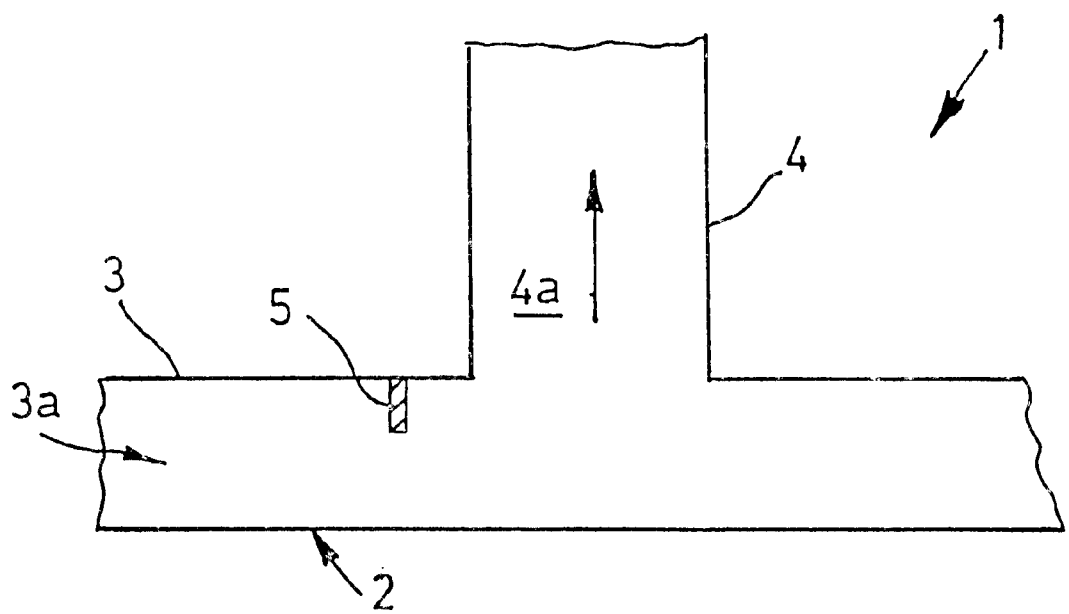
FIG. 3 is a schematic side view of apparatus according to one aspect of the invention.
Figure 4:
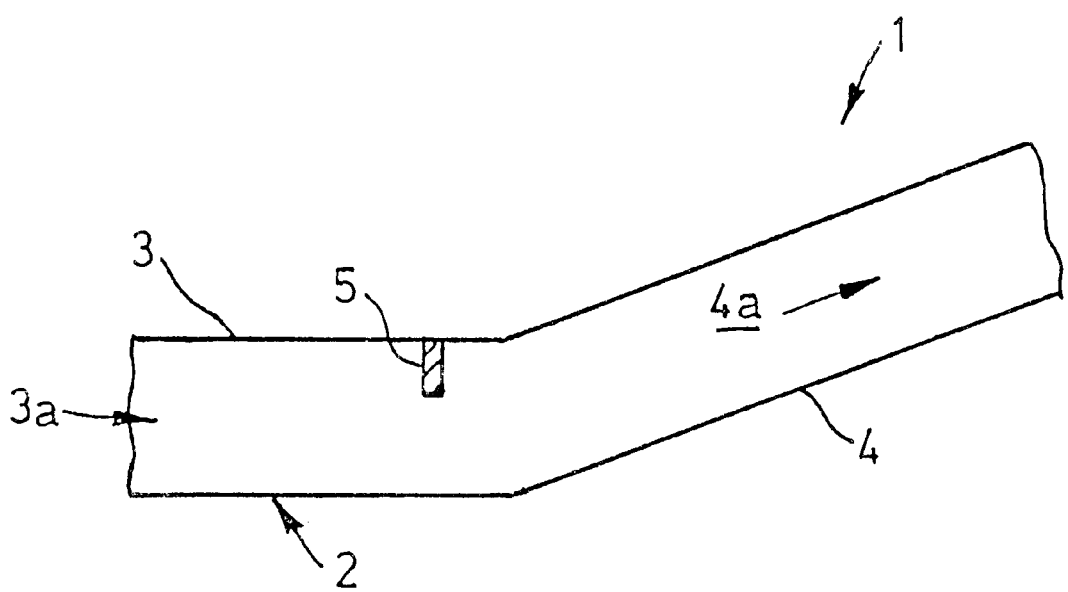
FIG. 4 is a schematic side view of a further embodiment of apparatus according to the invention.
Figure 6:
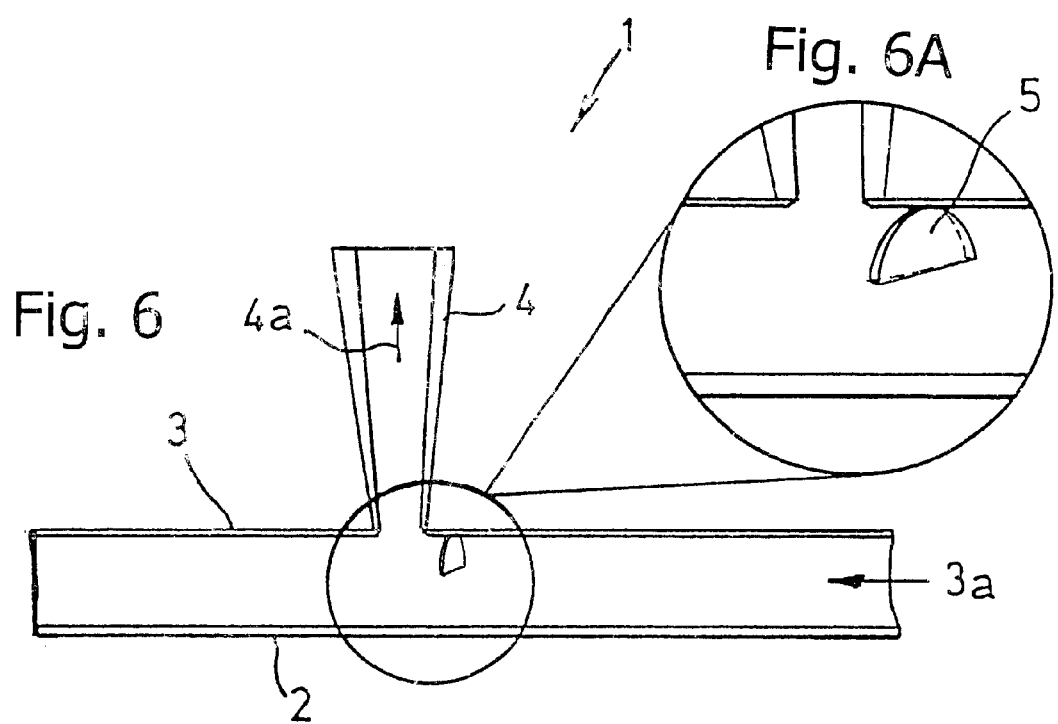

Referring in particular to FIGS. 3, 4 and 6, there is illustrated fluid-flow apparatus 1, comprising a conduit 2 having a first part 3 defining a first flow direction 3a and a second part 4 defining a second flow direction 4a deviating from the first flow direction 3a, and deflector means 5 disposed in the conduit 2 to promote substantially uniform flow in the second part 4.

As will be appreciated, the deflector means 5 comprises the device of FIGS. 1 and 2, shown with the tab 12 cut-away for clarity. The deflector means 5 is positioned in the first part 3 of the conduit 2, upstream from the second part 4, which in the embodiment of FIG. 6 is a conical outlet for use in water treatment equipment as described in detail below. By varying either the size or the location of the deflector means 5 flow can be deflected to either the (1) nearest side of the second part 4 or (2) the furthest, opposite or most remote side of the second part 4. The larger the plate 11 the more the flow is made to lean or be directed to a side that is opposite to the side of the second part 4 to which the flow would be concentrated without the plate 11. Thus, the larger the plate 11, the more the flow is diverted to the side of the second part 4 that is nearest the plate 11. The closer the deflector 5 is to the second part 4, the more the flow leans or is diverted to the side of the second part 4 that is opposite to the side of the second part 4 to which flow is ordinarily concentrated without the deflector 5. Thus, the closer the deflector 5 is to the second part, the more the flow is directed to the side of the second part that is nearest the deflector 5.

In order to best illustrate the invention, its use in a specific type of water treatment installation will now be described.

Figure 5:
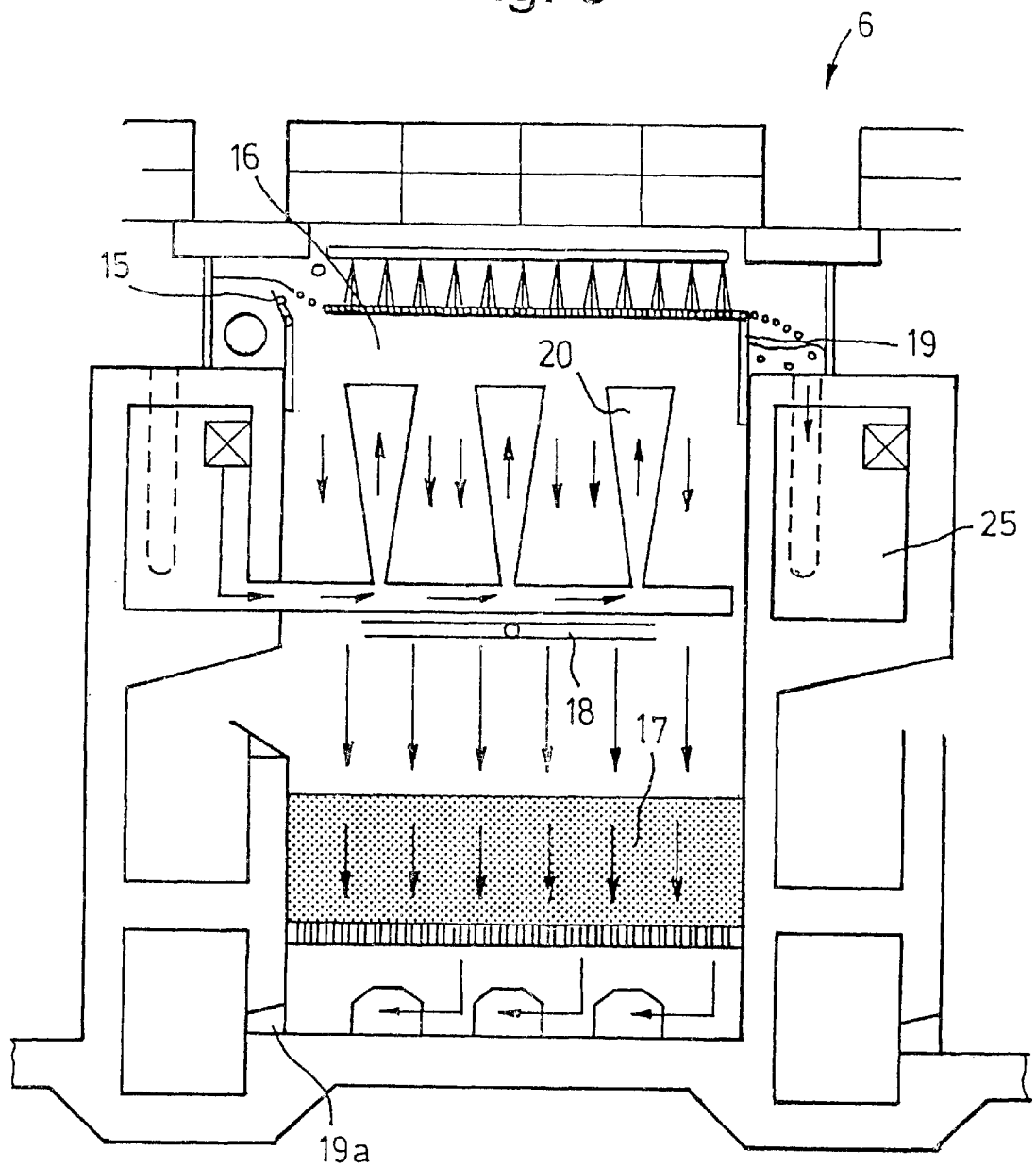
FIG. 5 is a schematic drawing of a water treatment device suitable for use with apparatus according to the invention.

Referring to FIG. 5, there is illustrated water treatment equipment 6 for removing impurities from liquid such as water.

The equipment 6 comprises a flotation tank 16 situated above a filter bed 17 of anthracite on sand, though it will be understood that any suitable material may be used for the filter, such as sand per se. An inlet for water supersaturated with air is provided in the form of an inlet manifold 18 leading to a ramified structure comprising a grid. Water to be treated is fed into the equipment 6 via inlet cones 20, which are situated above the inlet manifold 18.

The grid 18 produces a zone of air micro-bubbles extending across substantially the whole of the area of the tank 16. The air bubbles are initially dissolved in the water, but come out of solution when they emerge from the grid to form micro bubbles which effectively form a blanket of air across the whole tank, the air bubbles adhering to impurities in the water and raising them to the surface forming a sludge blanket which is discharged from the tank over a weir 19 intermittently and in a controlled manner. The equipment 6 is under automatic control using ultrasonics and based on data relating to on-line flow and turbidity, with protection against process failure and deterioration in water quality.

Clean water is passed out of the tank 16 and filter bed 17 via outlet 19a to a clean water holding tank. Some of the water from the holding tank is recycled to provide the source of micro-bubbles. This water is passed to a saturator (not shown), packed with suitable plastic contact media such as Pall rings, where it is contacted with air under pressure from a compressor, the air flow being controlled by a float system.

The scum collected on the surface of the liquid in the tank 16 is removed periodically by raising the level of the water in the tank 16 by operation of suitable valving, to decant the scum over the weir 19 into a channel 25 from which it can be removed. There is a second weir 15 with a curved lip, known as a ski-jump weir, which provides a horizontal flow of liquid at its surface across the tank 16. This is achieved in that influent is passed to the ski-jump weir, again by suitable valve operation, to pass influent over the weir so as to push the scum laterally to the channel 25.

The counter-current flotation aspect allows the filter bed 17 to run for extended periods, even during high algal bloom loads, without the need to backwash at greatly increased frequencies. The equipment 6 can thus operate in a peak-lopping mode and flotation in tank 16 could be discontinued when raw water inlet quality is good, so saving on the cost of continuous operation. The de-scumming operation referred to may be carried out without stopping the flotation and filtration process.

The upwardly directed inlets 20 are conical. In other words the width of the cross-section of the inlets 20 increases at axial parts of the inlet furthest from the divergence. This helps to avoid damage to the sludge blanket and disruption to the flotation zone by large, high 20 energy, toroidal vortices. However, even using conical inlets 20 some disruption of the sludge blanket may still occur because of non-uniform flow, and a persistent difficulty in the water treatment process carried out in this equipment has been to ensure that the flow through the inlet cones 20 is evenly distributed. Failure to do this may result in disruption of the sludge blanket and create additional undesired flow circulation.

Referring to FIGS. 6 and 6A, apparatus according to the invention is illustrated, as it would be used in the equipment 6 described above. The conduit 2 is drawn showing only one inlet cone 20, with water entering from the right as viewed.

The left-hand end of conduit 2 (as viewed) could be a dead-end, or could lead to a further series of cones 20 as shown in FIG. 5.

The performance of many treatment processes has been successfully studied using the computational fluid dynamics technique (CFD). In order to demonstrate the effect of the present invention on the above described treatment equipment and process this CFD technique was used. The CFD procedure is well known and will not be described further.

Figure 7:
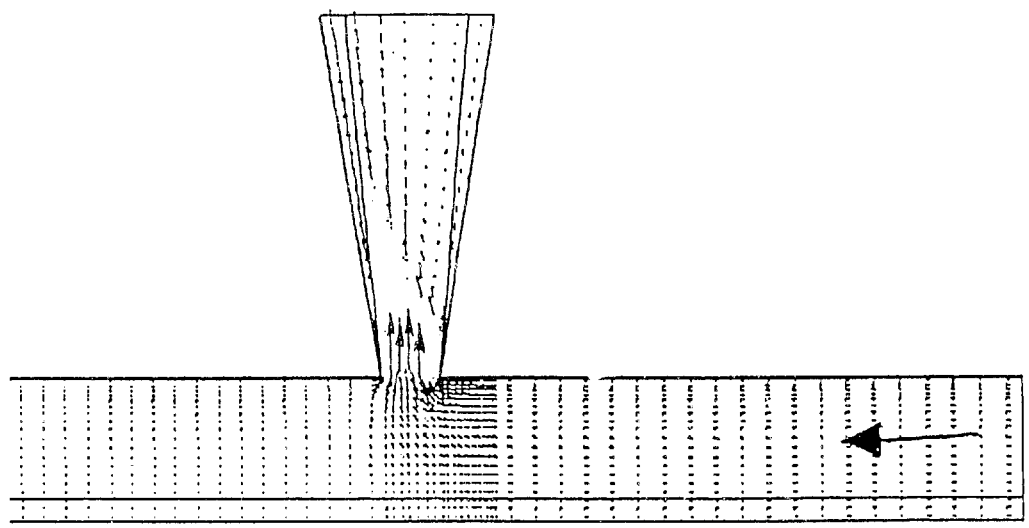
FIGS. 7 and 8 are schematic side views showing flow patterns in prior apparatus (FIG. 7) and apparatus according to the invention (FIG. 8).
Figure 8:
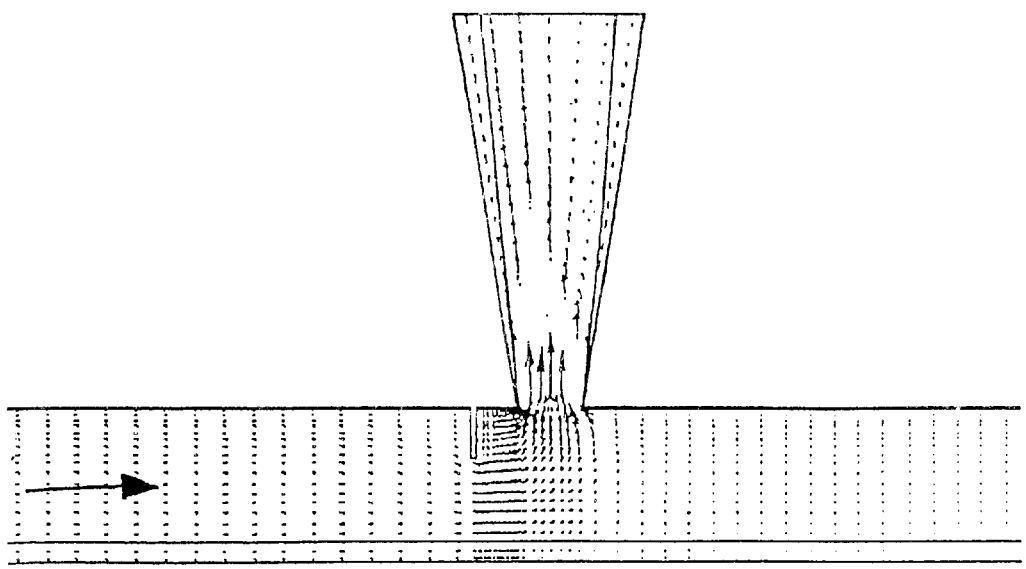

Referring to FIGS. 7 and 8, the results of the CFD simulation for the existing cone arrangement (FIG. 7) and apparatus according to the invention (FIG. 8) are illustrated. In FIG. 7, water-entering conduit 2 from the right flows upwardly into the cone 20, but as can be seen by the flow lines, the flow is substantially biased toward the left as viewed. This occurs because the flow momentum in the main pipe is maintained. Now referring to FIG. 8 which is shown in the opposite orientation with water entering from the left, the baffle 5 changes the flow pattern, which no longer leans toward the left (as viewed) but is more uniformly distributed.

In this particular water treatment equipment, the benefits obtained from uniform flow from the cone inlets 20 are great. Previously, relatively tall cones were needed to obtain an even flow pattern. Using the invention the height of the cones can be reduced saving cost, and even the height of the tank 16 can be reduced, again saving on cost. The skilled worker will appreciate that corresponding benefits to other equipment in which uniform flow is desirable will be achieved. Thus, using the invention as illustrated in this example, a uniform flow downstream of a divergence in a conduit can be achieved.

What is claimed is:

1. A flow deflecting device, comprising a substantially planar baffle adapted to be disposed in a conduit having a first part defining a bore of substantially circular cross section having a first flow direction and a second part defining a second flow direction deviating from the first direction, to promote substantially uniform flow in the second part, wherein the baffle comprises a segment defined by an arc and a chord of the bore.

2. A device according to claim 1, the baffle corresponding in shape to a segment of the cross-sectional area of the first part of the conduit.

3. A device according to claim 1, including mounting means.

4. A device according to claim 3, the mounting means comprising a tab disposed substantially perpendicularly to the baffle.

5. A device according to claim 4, the tab being shaped to correspond with the shape of a conduit in which it is to be situated.

6. A fluid flow apparatus, comprising a conduit having a first part defining a first flow direction and a second part defining a second flow direction deviating from the first direction, and deflector means comprising a segment defined by an arc and a chord of the first part, said deflector means disposed in the conduit to promote substantially uniform flow in the second part.

7. Apparatus according to claim 6, wherein the deflector means depends from a wall of the conduit.

8. Apparatus according to claim 7, wherein the deflector means is disposed in the first part.

9. Apparatus according to claim 8, wherein the deflector means is disposed on the same side of the conduit as the direction of deviation of the second part.

10. Apparatus according to claim 9, the deflector means being substantially planar.

11. Apparatus according to claim 10, the deflector means comprising a plate.

12. Apparatus according to claim 7, wherein the deflector means depends substantially perpendicularly from the wall of the conduit.

13. Apparatus according to claim 7, the deflector means extending from the wall, a distance that is from 5% to 50% of the width of the cross-section of the conduit.

14. Apparatus according to claim 8, wherein the conduit comprises a substantially circular bore, the deflector means being disposed a distance from the center of the bore of the second part corresponding to from ½ to 2×the diameter of the bore of the first part.

15. Apparatus according to claim 6, the width of the cross-section of the second part increases, the further from the divergence.

16. Apparatus according to claim 15, the second part being substantially conical.

17. Apparatus according to claim 6, adapted for conducting liquid.

18. Apparatus according to claim 17, the liquid comprising substantially water.

19. An inlet device for delivery of water to a water treatment device, including a device as claimed in claim 1.

20. A counter-current dissolved air flotation device, including a device as claimed in claim 1.

21. A method for promoting uniform fluid flow in a second conduit and a system that comprises a first conduit and a second conduit in fluid communication with the first conduit, a second conduit diverging from the first conduit whereby the first conduit has a first axis and the second conduit has a second axis, the first axis and the second axis intersecting with an included angle of less than 180 degrees, wherein the method for promoting uniform fluid flow in the second conduit comprises:

providing a fluid flow sequentially from said first conduit to said second conduit; and providing a flow deflector in the first conduit, said flow deflector comprising a segment defined by an arc and a chord of the first conduit.

22. The method in accordance with claim 21, wherein said step of providing a flow deflector includes providing that flow deflector upstream of any part of said second conduit.

23. The method in accordance with claim 22, wherein said step of providing a flow deflector includes providing that flow deflector on a side of the first conduit which is the same side of said first conduit from which said second conduit diverges from said first conduit.

24. A method for treating water that includes the method in accordance with claim 21.

* * * * *